United States Patent [19]

Ishitani

[11] Patent Number: 5,367,625
[45] Date of Patent: Nov. 22, 1994

[54] METHOD FOR DESIGNATING OBJECT ON SCREEN

[75] Inventor: Takashi Ishitani, Habikino, Japan

[73] Assignee: Sharp Kabushiki Kaisha, Osaka, Japan

[21] Appl. No.: 38,962

[22] Filed: Mar. 29, 1993

[30] Foreign Application Priority Data

Mar. 31, 1992 [JP] Japan .................................. 4-074920

[51] Int. Cl.$^5$ ............................................. G06F 15/46
[52] U.S. Cl. ...................................... 395/159; 395/161
[58] Field of Search ............... 395/159, 161, 157, 155, 395/154, 153, 158

[56] References Cited
U.S. PATENT DOCUMENTS 5,134,560  7/1992  Ferriter et al. ................. 395/159 X

OTHER PUBLICATIONS

Japanese Patent Application Laying Open No. 2-110777, laid open on Apr. 23, 1990.
Japanese Patent Application Laying Open No. 64-15872, laid open on Jan. 19, 1989.

Primary Examiner—Heather R. Herndon
Assistant Examiner—Cliff Nguyen Vo
Attorney, Agent, or Firm—Dike, Bronstein, Roberts & Cushman

[57] ABSTRACT

A method of designating an object including the steps of: designating a certain point on a display unit 3 utilizing an input unit 2 such as a mouse and coordinate-transforming at a coordinate transformation unit 4, calculating an association degree between a detection point and an object displayed on display unit 3 according to a table 7 of association coefficients defined between attributes provided to objects displayed on display unit 3 depending upon the distance between them and an attribute provided to the detection position, thereby selecting an object having the maximum association degree.

13 Claims, 8 Drawing Sheets

METHOD FOR DESIGNATING OBJECT ON SCREEN

BACKGROUND OF THE INVENTION

1. Field of the Invention

The present invention relates generally to a method for designating selection of displayed characters and figures utilizing a pointing device such as mouse and pen, in an information processor having a display unit such as computer and word processor.

2. Description of the Related Art

In a text and a figure on the display picture plane of a display unit such as computer and word processor, a range for editing must be designated in the test in some cases. In such a case, it is a common practice to designate a selection starting point and a selection ending point, by moving a cursor utilizing a keyboard. In recent years, however such selection starting point and ending point are designated utilizing a pointing device such as mouse in many cases. In such a case, generally, designation of the position of the starting point is performed first, and then designation of the ending point is performed as a separate operation. However, recently, a method of designating starting time and ending time in a series of operations called "drag operation" has been employed.

The drag operation proceeds as follows. For a mouse, for example, the mouse cursor is positioned on a starting point and a switch provided to the mouse is pressed (the operation called "click"), the mouse cursor is moved to an ending position while the switch being pressed, and the switch is released at the ending position. While the switch is pressed, the system always detects the position of the mouse cursor, and explicitly notifies the user of a range to be processed changing with the movement of the mouse cursor by inverting or changing the point representing the range moment by moment for display. Herein, the drag operation will mainly be described.

Referring to FIG. 1, a conventional apparatus of this kind includes a key CPU (Central Operation Unit) 2 for controlling a pointing device, a keyboard and the like. Coordinate data input from the pointing device is once preserved in a memory 4 and transferred to CPU 1 at the same time. CPU 1 extracts the coordinate data from memory 4 according to a program stored in a program memory 6 and stores the extracted data in a memory 8. CPU 1 also refers to the coordinate data extracted from memory 4, extracts data on corresponding points (or region), and characters and figures from a VRAM (Video Random Access Memory) 3 and preserved the data as needed in a cut buffer 5.

Conventionally, selection of an object displayed on a display device such as a character string requires the following operation. Referring to FIG. 2, in step SA10, the user positions the mouse cursor on a starting point and clicks. Thus, coordinates representing the position of the mouse cursor are taken. At that time, the mouse cursor must be exactly within the display region of the object characters.

Subsequently in step SA20, the obtained coordinate information on the display is transformed into a system of coordinates for use in a processing in the system. This is a transformation from an absolute display on the picture plane to a relative display using the upper left part of a window as reference, for example when a window display is performed. In the case of text display, transformation into a system of coordinates which represent the position of characters in row and column positions. It is assumed that after the switch of the mouse is pressed in step SA10 the switch continuous to be pressed.

Subsequently in step SA30, a processing of detecting the pointer position of the mouse cursor according to the movement of the mouse is performed. Thus obtained information is also formed of the absolute coordinates of the pointer position of the mouse cursor on the picture plane.

In step SA40, a processing of transforming the coordinates obtained in step SA30 into a system of coordinates used in the system is performed.

In step SA50, a character string present between the starting position designated in step SA10 and the pointer position determined in step SA30 is determined as a selection region.

In step SA60, all the characters within the region selected in step SA10 are inverted for display.

In step SA70, a detection whether or not the drag operation of the mouse has been completed, in other words whether or not the pressing operation of the switch provided to the mouse has been completed is performed. If the drag operation has been completed, the control proceeds to step SA80, and otherwise the control returns to step SA30. As long as the drag operation continues, the processings in steps SA30-SA70 are repeatedly performed, the determination display of the selection region is repeatedly performed according to the movement of the pointer position of the mouse and further characters are selected if the selection region expands.

When the drag operation has been completed and the control proceeds to step SA80, the user inputs a command representing what processing to be performed to the selection region. In step SA90, the processing according to the command detected in step SA80 is issued to the selection region. In the case of "cut and paste" processing, the character string in the selected region is transferred to a storage region called a cut buffer for exchanging data between applications.

However, according to such a conventional method for designating objects, the point of the pointing device such a mouse cursor must correctly be positioned within the display region of the selected object. However slightly it may be, if the pointer is shifted from the character of the selected object, the character can not be selected or a wrong object can be selected.

If an object to be selected is relatively large, it is not very much difficult to position the point of the pointing device exactly on the object. However, the resolution of display units increase and information for display increases, selection objects tend to be small. As a selection object shrinks, the operation of moving the point of a pointing device exactly on the selection object becomes tremendously difficult, and as a result, wrong objects are often selected by mistakes.

SUMMARY OF THE INVENTION

It is therefore an object of the invention to provide a method of selecting an object by which a desired object can be readily selected without positioning the point of a pointing device exactly on a selection object.

Another object of the invention is to make it easy to select a desired object based on its attribute such as kind without positioning the point of a pointing device exactly on the object.

A still further object of the invention is to make it easy to select an object within a desired range based on its attribute such as kind without positioning the point of a pointing device exactly on the object.

An additional object of the invention is to make it easy to select a desired one of objects displayed small in size without positioning the point of a pointing device exactly on the object.

According to a method of the invention, in an information processor including a display device for displaying a plurality of objects on a prescribed display region, an input device manually operable for designating an arbitrary position on the display region, a device for outputting information for specifying the position of the designated arbitrary point, and a storage device, one or a plurality of arbitrary objects displayed on the display region are designated using the input device. This method includes designating an arbitrary point on the display region utilizing the input device, thereby obtaining information for specifying the position, and selecting one object based on a distance between each object and a designation point based on the information for specifying the position, an attribute provided to each object, and an attribute provided to the designation point.

Even if the designated point does not fall within the range of the object itself, since one object is selected depending upon a distance between the designation point and each object and attributes provided to the designation point and each object, a desired object can readily be designated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
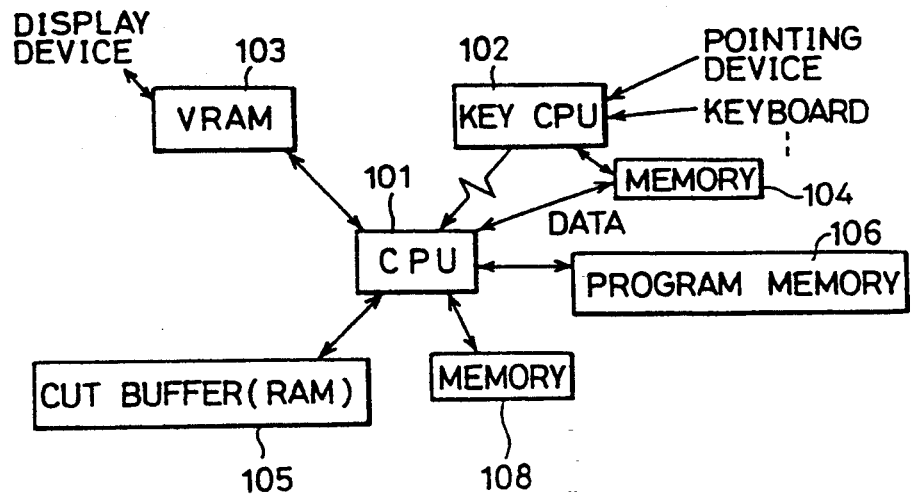
FIG. 1 is a block diagram showing a conventional apparatus.
Figure 2:
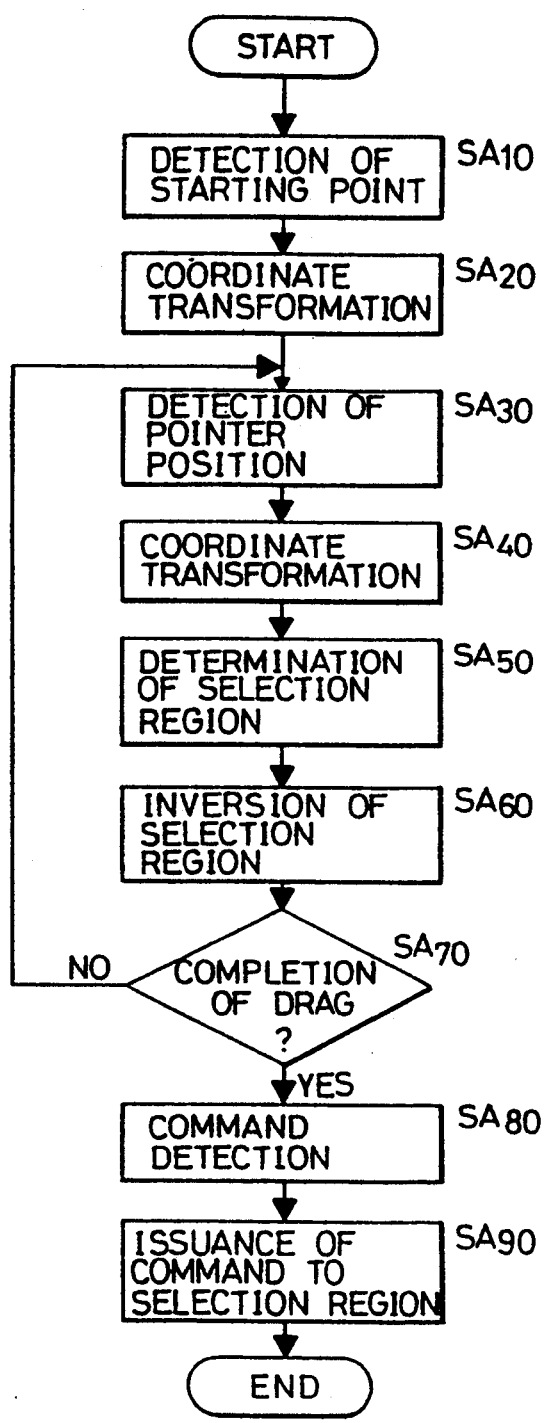
FIG. 2 is a flow chart for use in illustration of a main routine for implementing a conventional method.
Figure 3:
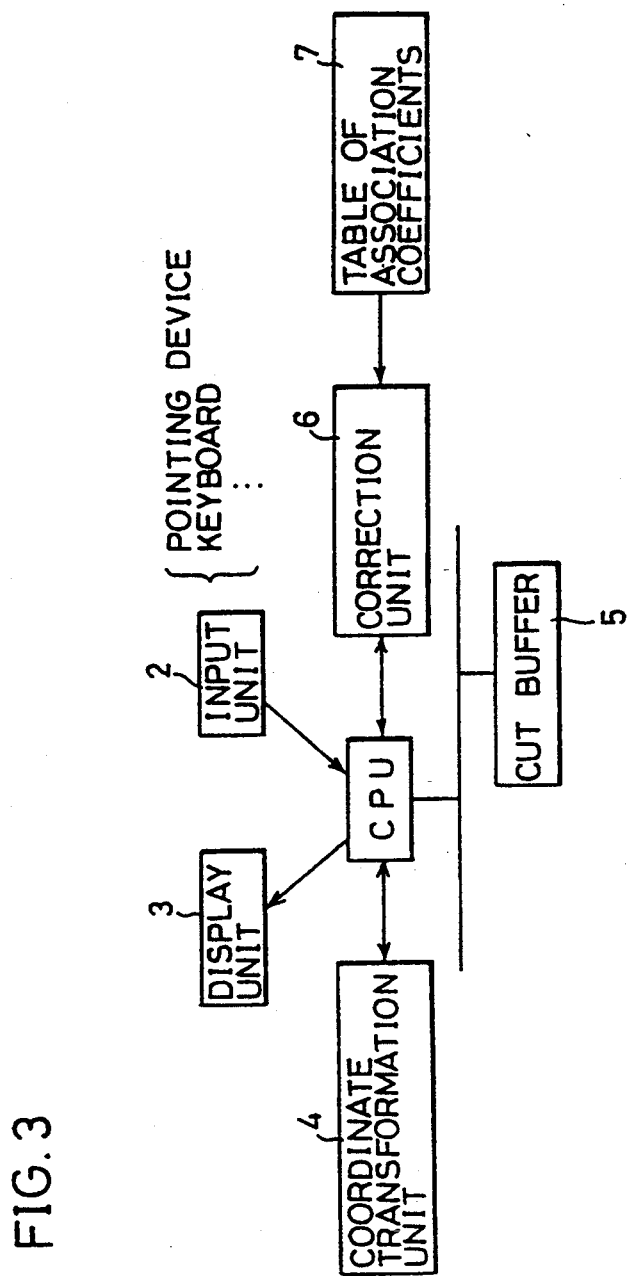
FIG. 3 is a block diagram showing an apparatus for implementing a method according to the invention.

Now, one embodiment of the invention will be described in conjunction with the accompanying drawings. FIG. 3 is a diagram showing the hardware structure of an apparatus for implementing a method of designating an object according to the invention. Referring to FIG. 3, the apparatus includes a CPU (Central Processing Unit) 1, an input unit 2 connected to CPU 1 and including a pointing device formed of a mouse, a pen or the like and a keyboard, a display unit 3 connected to CPU 1 and formed of a CRT (Cathode Ray Tube) or the like, a coordinate transformation unit 4 for transforming coordinates on a picture plane obtained by designating an arbitrary position on the display of display unit 3 utilizing the pointing device into a system of coordinates for use in processing in the system, a detection position correction unit 6 connected to CPU 1 for correcting the designation point by the pointing device converted by the coordinate conversion portion 4 by a method according to the invention and providing CPU 1 with the corrected information, a cut buffer 5 connected to CPU 1 through a bus or a network and serving as a preservation buffer when data is exchanged between applications executed on CPU 1, and an association coefficient table 7 connected to detection position correction unit 6 for storing in the form of table association coefficients defined between attributes provided to selection objects displayed on display unit 3.

In this embodiment, it is assumed that the display object displayed on display unit 3 form a text. Each of the selection objects is a character. For example, for attributes provided to characters, KANJI, HIRAGANA, and KATAKANA characters, symbols, numerals, and alphabets are considered. Coefficients define degrees of association between attributes provided to these characters (referred to as "association coefficients") are stored in the form of table in the association coefficient table 7.

In this embodiment, for the attributes of selection objects, KANJI, HIRAGANA and the like are defined as described above. However, the attribute of a selection object is defined in response to an aspect and an object to be process. It is convenient to use an attribute already defined to a selection object if any. In the embodiment, since a text is set as an object to be processed, the kinds of characters are utilized as attributes as described above. However, the invention is not limited to such a case in which the attribute of the kind of a character is utilized, but the kind of a figure can also be used as an attribute as will be described later. Alternatively, if processing is performed to a selection object not on a character by character basis but on a word by word basis parts of speech such as noun and verb can be employed by the aid of a word dictionary. If a semantic dictionary and a word dictionary are combined in use, something like "a part of speech belonging to a certain technological field" can be designated as an attribute.

Now, the operation of the apparatus shown in FIG. 3 will be described. In the following, the case in which a character string in a fixed region is set as a selection object by a drag operation utilizing a mouse will be described.

The selection starting point of a selection object is input by input unit 2. Thus, coordinate data on the point designated on the picture plane is sent to CPU 1.

The picture plane coordinates sent to CPU 1 are transformed into coordinate data corresponding to the selection object for processing in the system. If, for example, an object to be processed is a window-displayed text, it is transformed into relative coordinates having the upper left part of the window as origin, and in some cases further transformed to information represented by the rows and columns of characters.

CPU 1 applies thus coordinate-transformed coordinate data to detection position correction unit 6. Detection position correction unit 6 converts the coordinate data into a value representing the display region of any of the characters of the selection object, based on the applied coordinate data, the display position of each of the characters displayed on display unit 3 and the attribute of each of the characters, and applies the resultant data to CPU 1.

CPU 1 selects a prescribed one of the plurality of characters displayed on display unit 3 based on the information applied from detection position correction unit 6 and have the selection starting position displayed on display unit 3.

Correction of the detection position of detection position correction unit 6 is performed referring to the association coefficient table 7 based on the coordinate data after the coordination transformation and each of the attributes provided to the characters displayed on display unit 3, and the detail of which will be described later. Since there is nothing selected so far at the starting point for selection initiation, the processing therein is slightly different from the case of selection at the ending point in the selection region, the content of which will be described later.

In the case of drag operation utilizing a mouse, for example, the switch on the mouse is pressed by the user to designate the above-described selection starting point and then the mouse cursor is moved while the user still pressing the switch. The position designated by the mouse cursor is always sent to CPU 1 in the form of picture plane coordinate data by the system as the region's ending point.

CPU 1 and coordinate transformation unit 4 perform the same processing as the case when a selection starting point is input. Since there exists an object already selected (or to be selected), detection position correction unit 6 performs a processing slightly different from the case of detection starting point, thereby correcting the ending position, and sends the corrected data to CPU 1. In the correction, as is the case with the correction of the selection starting point, the association coefficient table 7 is referred to. CPU 1 decides a selection region by deciding the ending point according to the corrected data from detection position correction unit 6. CPU 1 has the selection region reversed or the like utilizing display unit 3.

If the user releases the switch of the mouse at a desired selection ending point position, the output of detection position correction unit 6 at that time is the ending point of the selection region.

If some command is input from the keyboard of input unit 2 or the like while the selection of an object is thus going on, CPU 1 issues a command for the present selection object. For example, if a copy command to the cut buffer used in the case of text cut and paste or the like, CPU 1 transmits the selection object to cut buffer 5.

Figure 4:
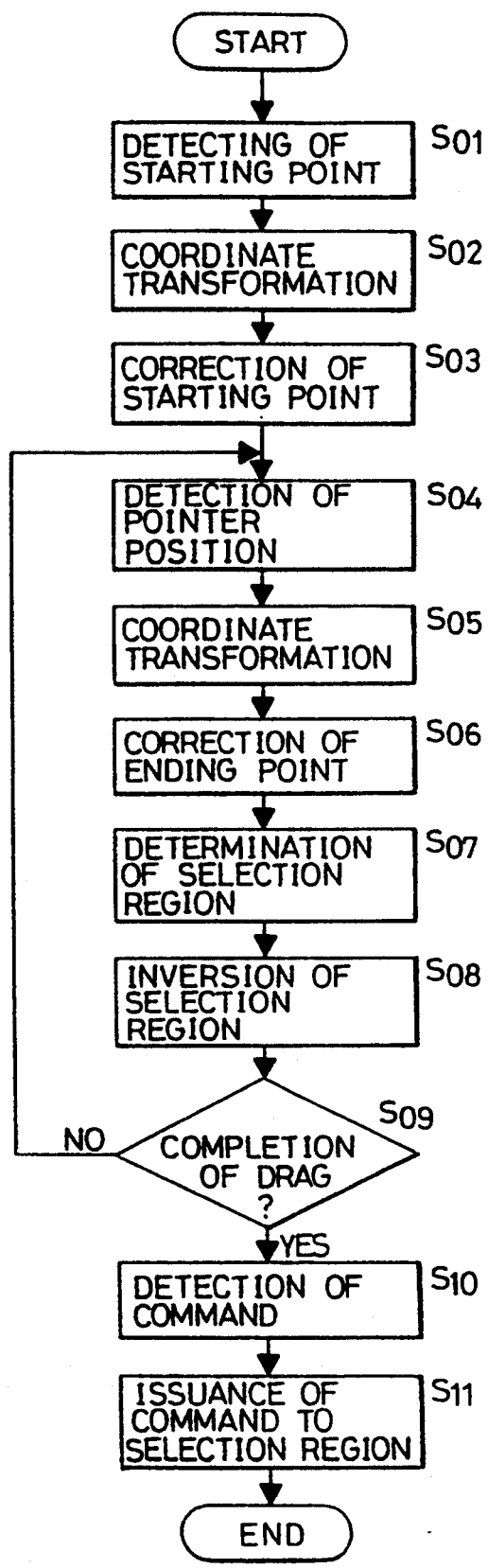
FIG. 4 is a flow chart for use in illustration of the main routine of a program for implementing a method according to the invention.
Figure 5:
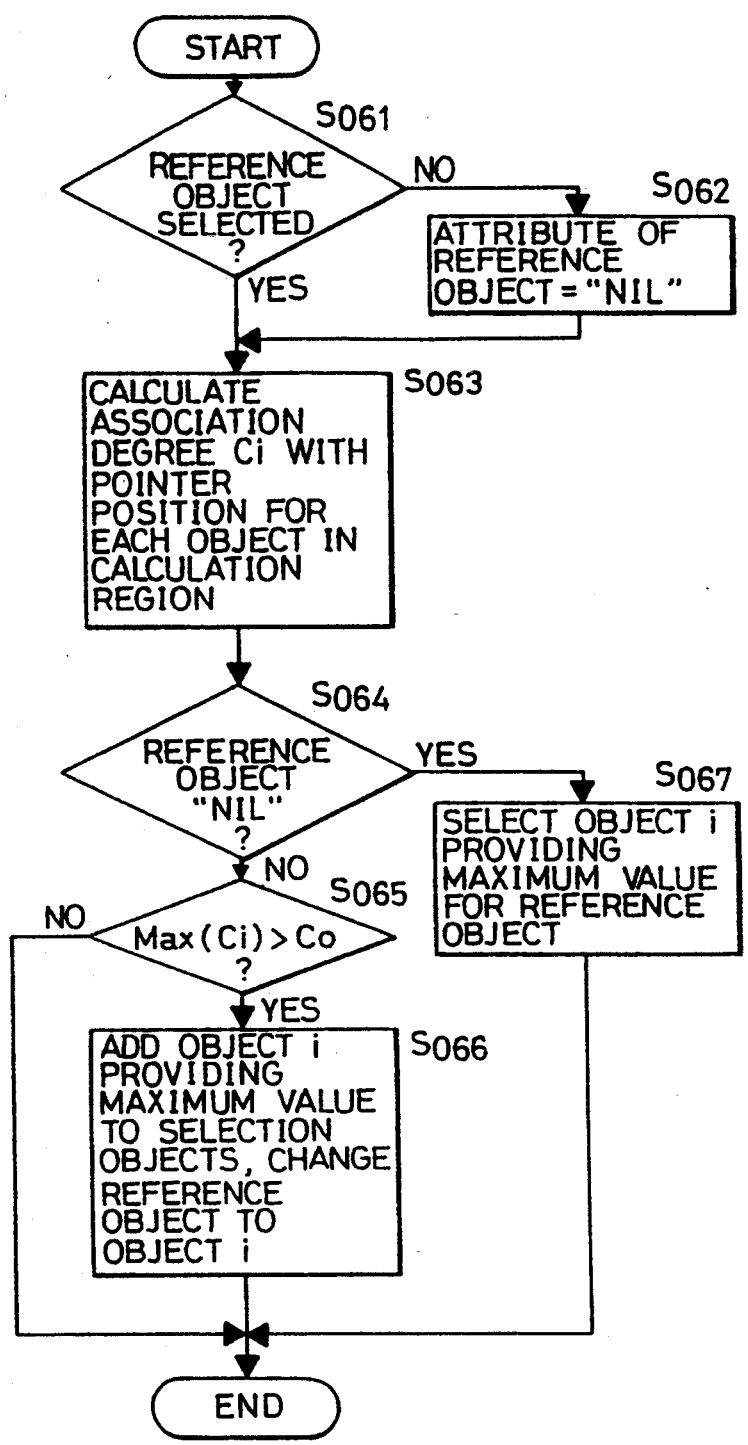
FIG. 5 is a flow chart for use in illustration of a routine for correcting the coordinate position of a designation point in the method according to the invention.

FIGS. 4 and 5 are flow charts each showing a portion related to selection of a region in a program executed by CPU 1. Hereinafter, description will be provided on a processing when a region is designated by means of a drag operation with a mouse.

In step S01 in FIG. 4, the picture plane coordinate data of a starting point is applied to the program from the mouse.

In step S02, the picture plane coordinate data is transformed into coordinate data for processing in the system such as relative coordinates as described above. Since the processing is usually performed, a detailed description of the operation will not be provided here.

Subsequently in step S03, a processing for correcting the coordinate data of the starting point which constitutes one characteristic of the method according to the invention is performed. The processing will be described later in detail in conjunction with FIG. 5.

Subsequently in steps S04–S09, detection of the ending point of the selection region during the drag operation is repeatedly performed, and every time the region deforms with the movement of the mouse cursor, a selection region corresponding thereto is displayed. In step S04, the pointer position of the mouse cursor at the time is detected by input unit 2, and given to the program. In step S05, the detected picture plane coordinate data is transformed into a value of system of coordinates to be used in the system.

In step S06, correction of the ending point is performed to the coordinate data after transformation obtained in step S05 in the same way as in step S03. The correction processing corrects the detection data so that the part of a selection object with the highest degree of association is apparently designated among all the selection objects displayed on the picture plane.

In step S07, based on the coordinate position decided to be the ending point of the region obtained as the result of correction in step S06, the starting point of the region obtained in step S03 and the region present between these points is decided to be a selection region.

In step S08, display unit 3 is controlled to have the selection region reversed, for example.

In step S09, a determination whether or not the switch of the mouse is released is performed. If the switch is released, the control proceeds to step S10 on the assumption that the drag operation has been completed, and if the switch is not released, the control returns to step S04 assuming that the drag operation still continues.

In step S09, if it is determined that the drag operation has been completed, a command input from the keyboard or the like of input unit 2 is detected in step S10. In step S11, a command such as a copy command to the cut buffer as described above is issued to the region selected by the processings in steps S01–S09.

FIG. 5 is a flow chart showing the correction processing of the starting point or the ending point executed in steps S04 and S06 in FIG. 4. It is noted that in the following, a text formed of character strings is assumed to be an object to be processed. The following Table 1 is utilized as an association coefficient table defined between the attributes (kinds) of the characters.

TABLE 1

| Attribute of Reference Object | Attribute of Non-reference Object | | | | | |
|---|---|---|---|---|---|---|
| | KANJI | HIRAGANA | KATAKANA | NUMERALS | SYMBOLS | ALPHABETS |
| KANJI | 1.0 | 0.8 | 0.5 | 0.3 | 0.3 | 0.2 |
| HIRAGANA | 0.5 | 1.0 | 0.5 | 0.3 | 0.5 | 0.2 |
| KATAKANA | 0.3 | 0.7 | 1.0 | 0.5 | 0.3 | 0.2 |

TABLE 1-continued

| Attribute of Reference Object | Attribute of Non-reference Object | | | | | |
|---|---|---|---|---|---|---|
| | KANJI | HIRAGANA | KATAKANA | NUMERALS | SYMBOLS | ALPHABETS |
| NUMERALS | 0.3 | 0.3 | 0.3 | 1.0 | 0.7 | 0.7 |
| SYMBOLS | 0.3 | 0.3 | 0.3 | 0.5 | 1.0 | 0.5 |
| ALPHABETS | 0.2 | 0.2 | 0.2 | 0.8 | 0.7 | 1.0 |
| NIL | 1.0 | 1.0 | 1.0 | 1.0 | 0.8 | 1.0 |

In Table 1, "reference object" means an already selected object used as a reference for providing an attribute to a point designated, when an association coefficient between the designated point and a selection object is produced. Any already-selected object can be utilized as a reference object. In the embodiment, the latest one selected among already selected objects is set as a reference object. "Non-reference object" is a selection object subjected to a calculation of an association degree with a designated point. In Table 1, "NIL" is included as an attribute. This is used when there is not any reference object, in other words when the starting point of a selection region is designated, for example.

A determination whether or not a reference object has been selected is made in step S061. When a selection has been made, the control directly proceeds to step S063. If a selection has not been made yet, "NIL" is set as the attribute of the reference object, and the control proceeds to step S063.

Referring to step S063 in FIG. 5, a processing is performed for calculating an association degree Ci between a pointer position and each character in a prescribed region around the position of the mouse pointer as a prescribed calculation region (including the reference object). The calculation is performed according to the following equation:

$$Ci = a_i \times \{1 - S_i/(P+b)\}$$

where Ci represents distance between a pointed position and an i-th selection object, $a_i$ an association coefficient decided according to Table 1 based on the combination of the attributes of the reference object and a selection object subjected to the calculation, $S_i$ distance between the selection object and the pointed position, P the size of character, and b distance between characters.

Herein, the Euclidean distance between the pointed position and the end point of a selection object nearest to the pointed position is defined for the distance Si in this embodiment. However, the definition of the distance is not limited to the Euclidean distance, but a sum of the difference between x coordinates and the difference between y coordinates may be defined as the distance. It is also not limited to the distance between the end point of the selection object nearest to the pointed position and the pointed position, but the distance from the center of gravity of a selection object can be employed, or another representative point such as the above-described center of gravity is set in an object and the distance between the representative point and the pointed position may be produced. For such a representative point, in the case of a character described above, the upper left or the lower right point of the character may be utilized. In the case of a figure which will be described later, a plurality of points are provided on the figure as representative points, and the shortest distance of the distances between these representative points and pointed position may be defined as the distance between the figure and the pointed position. Of course, the shortest distance does not have to be employed, but also the longest distance may be employed, or alternatively the average of the distances between all the representative points and the pointed position may be employed.

In the calculation given by equation (1) in step S063, an association coefficient is produced from an attribute provided to a pointed position and the attribute of a character subjected to the calculation. The attribute provided to the pointed position is the attribute of a reference object in this embodiment. In the calculation of the starting point of the region, the attribute of the reference object can not be determined, because there is not any selected object. In such a case, "NIL" in Table 1 as set in step S062 is utilized for the attribute of the reference object, and the association coefficient is produced according to Table 1 in combination with the attribute of a selection object subjected to the calculation. An association coefficient in processing for calculating the degree of association $C_0$ between the reference object and the pointer position is calculated from Table 1 assuming that the same attribute as reference object is given to the pointer position.

Subsequently, in step S064, it is determined whether or not the attribute of the reference object is "NIL", and if the attribute is "NIL", the processing proceeds to step S067 and otherwise to S065.

In step S065, it is determined whether or not the largest value of all the association degrees $C_i$ exclusive of $C_0$ calculated in step S63 is larger than $C_o$. If the largest value is not larger than $C_o$, the processing is completed at this point, but if it is larger than $C_o$, a processing for adding to already selected objects the object i giving such maximum value for the association degree in step S066. Then, a processing for changing the reference object into this object i is performed. Therefore, in a calculation performed in step S063 for the next time, the attribute of the object i selected in step S066 will be utilized.

Meanwhile, when the attribute of the reference object is "NIL", the selection starting point is designated. In step S67, an object giving the largest value of association degrees $C_i$ is selected to be a reference object and a starting point for a selecting a region.

Figure 6:
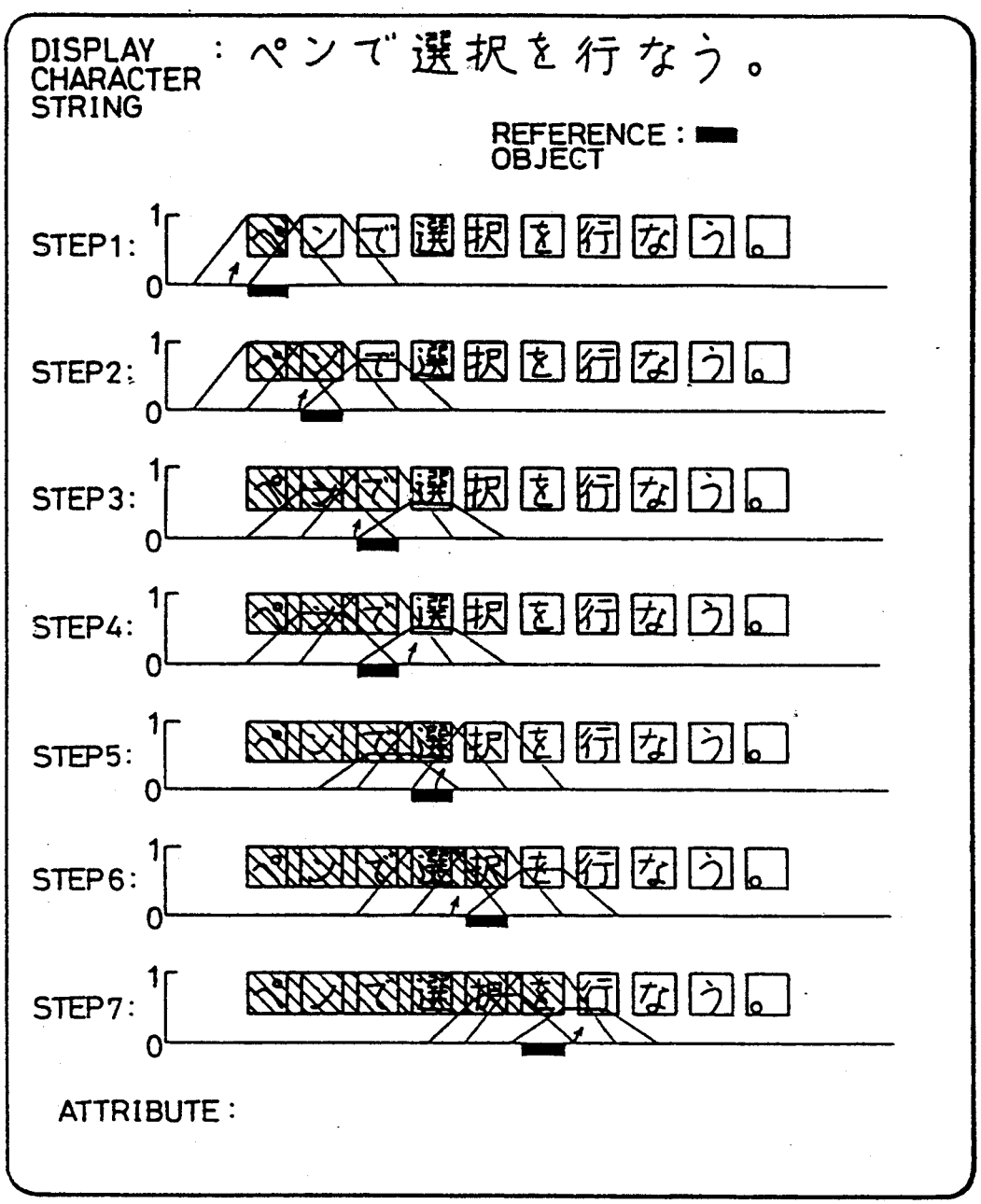
FIG. 6 is a schematic view showing an operation when a selection region is designated with respect to a character string transversely arranged in a row by drag operation.

FIG. 6 shows an operation when " ゝтакспs" is designated as an already selected object with respect to a character string " ゝтакспs". In step 1 in FIG. 6, the mouse cursor is located near the lower left of "ゝ". If the switch of the mouse is pressed at this position, "NIL" is selected for a reference object, a calculation according to Table 1 and equation (1) is performed, and "ゝ" is selected as the first already selected object. As indicated in thick line below "ゝ" in step 1, the character becomes a reference object in selection region designation subsequently performed. In steps 1-7 in FIG. 6, the degree of association between each selection object calculated according to equation (1) and a position shown by the mouse cursor is shown in a graph of a function taking the position of the mouse cursor for the abscissa and values 0–1 for the ordinate.

When the values of two functions shown overlapping "ヘ" and "ジ", when the function represented by "ジ" becomes larger than the value of the other function while the mouse cursor gradually moving rightwards, "ジ" is selected. "ジ" becomes a reference object. In step 2, as to "て" horizontally on the right side of "ジ", the association coefficient is 0.7 as set forth in Table 1 since the attribute of the reference object is KATAKANA and the maximum value is smaller than the case of the function showing the association coefficients to "ヘ" and "ジ".

When the mouse cursor is further moved rightwards and the function shown overlapping "て" is over the graph of the other two functions, "て" is selected as an already selected object. In this case, as can be seen from the three functions shown in step 2, even if the cursor is nearer to "て" than "ジ", "ジ" is selected as the already selected object, and "て" is not selected until the mouse cursor moves to the right by more than a certain distance. Thus, even when only "ぐ" is selected as an object, and the mouse cursor is excessively moved to slightly enter the position of "ひ", only "ぐ" will be designated as an already selected object. Thus, if a character displayed is very small, only a desired character string can be designated as an already selected object.

Set forth in steps 3–7 are the position of the mouse cursor and a graph showing the degree of association calculated between each character and the mouse cursor when the drag operation is subsequently performed. When the pointed position moves to the right, the degree of association with a reference object is calculated for every selection object as described above, and finally compared to the degree of association with the reference object itself. Among selection objects other than the reference object, if there is a selection object which shows a larger association degree than the association degree of the reference object itself, the selection object is taken into a new selection range and added to already selected objects. The reference object is also updated to the already selected object. The drag operation continues to be performed from thereon, and the same procedure is repeatedly performed to expand the range of selection.

In steps 1–7 in FIG. 6, functions showing association degrees changing with the movement of the reference object are shown. As can be seen from FIG. 6, a selection object taking the largest value among the values of a graph is actually an already selected object selected by the point position and the reference object as well.

In the above described embodiment, it is described that only the region separated from the pointed position by (size of the character)+(distance between characters) is determined as a calculation region when the degree of association is calculated. This is to reduce the amount of calculations for producing the degree of association. Association degrees with all the selection objects displayed (characters) could be produced without setting such a calculation region. However, most of such calculations are meaningless, and the same effect can be produced by a reduced amount calculations by providing limitations as described above. For example in step 3 in FIG. 6, the object for calculation of association degree includes only three characters "ジ", "ひ", and "玄".

Also in the above described embodiment, it is described that the reference object is "the one finally added to the already selected objects", but the invention is not limited thereto. For example, the reference object may be defined as "the one which has become an already selected object first". In this case, the form of graph representing a function indicating association degree becomes different from the case of FIG. 6.

Also in the above described embodiment, the case in which only one string of characters is horizontally arranged is described for ease of representation. However, the present invention is not only applicable to such one string of characters but also to selection of characters arranged in a plane. In that case, if the range of objects for calculating association degree is limited, another way of limitation would be effective rather than the above-described way of limiting the range. As one example, the calculation region may be defined as a region within a distance max [(size of character)+(distance between characters), (size of character)+(distance between rows)] around the position of the mouse cursor.

Figure 7:
FIG. 7 is a schematic view showing an operation when the region of a two-dimensionally arranged character string is designated.

FIG. 7 shows one example of operation when a range of a sentence displayed in a plurality of rows on the display device is designated. In the example shown in FIG. 7, the reference object is defined as "the one which has become an already selected object first".

Referring to FIG. 7, in step 1, the starting point of a selection region is designated. One character ("秋") having the largest association degree to the position of the mouse cursor shown in FIG. 7 is selected. The character becomes a reference object the attribute of which in calculating association degree after that is "KANJI". Then a drag operation is performed. When the point is moved to the right, a processing of calculating an association degree to each character in the calculation region is repeatedly performed, and at the same time the range of selection is expanded in the direction of rows (rightwards in FIG. 7). This is shown in step 2. It is noted that after step 2, the present position of the mouse cursor is represented at a usual arrow and the starting point by a hollow arrow.

Step 3 sets forth the state of selection when the point is moved slightly downwardly. When the position of the mouse cursor moves slightly downwardly from the position shown in step 2 and reaches a portion between the first and second rows of characters and close to the second row side, a selection objection having a high association degree is changed and the character " " in the second row is selected as the ending point of the range of selection. Accordingly, the character string " " is displayed inversely as an already selected object.

Thereafter, as the position of the mouse cursor is changed as set forth in steps 4–6, association degrees are repeatedly calculated with the movement of the point and when a character with the highest degree newly appears the range as far as the character is employed as a selection region.

According to a method of the invention as shown in FIG. 7, when the starting point and ending point of a character string two-dimensionally arranged are designated, the mouse cursor does not have to be placed on the last or first character, but the character can be selected by placing the cursor in the range in which the association degree becomes highest compared to other characters. Therefore, even if a large number of characters are displayed on a picture plane and the size of one character decreases as a result, a desired character can readily be selected without mistakes.

Figure 8:
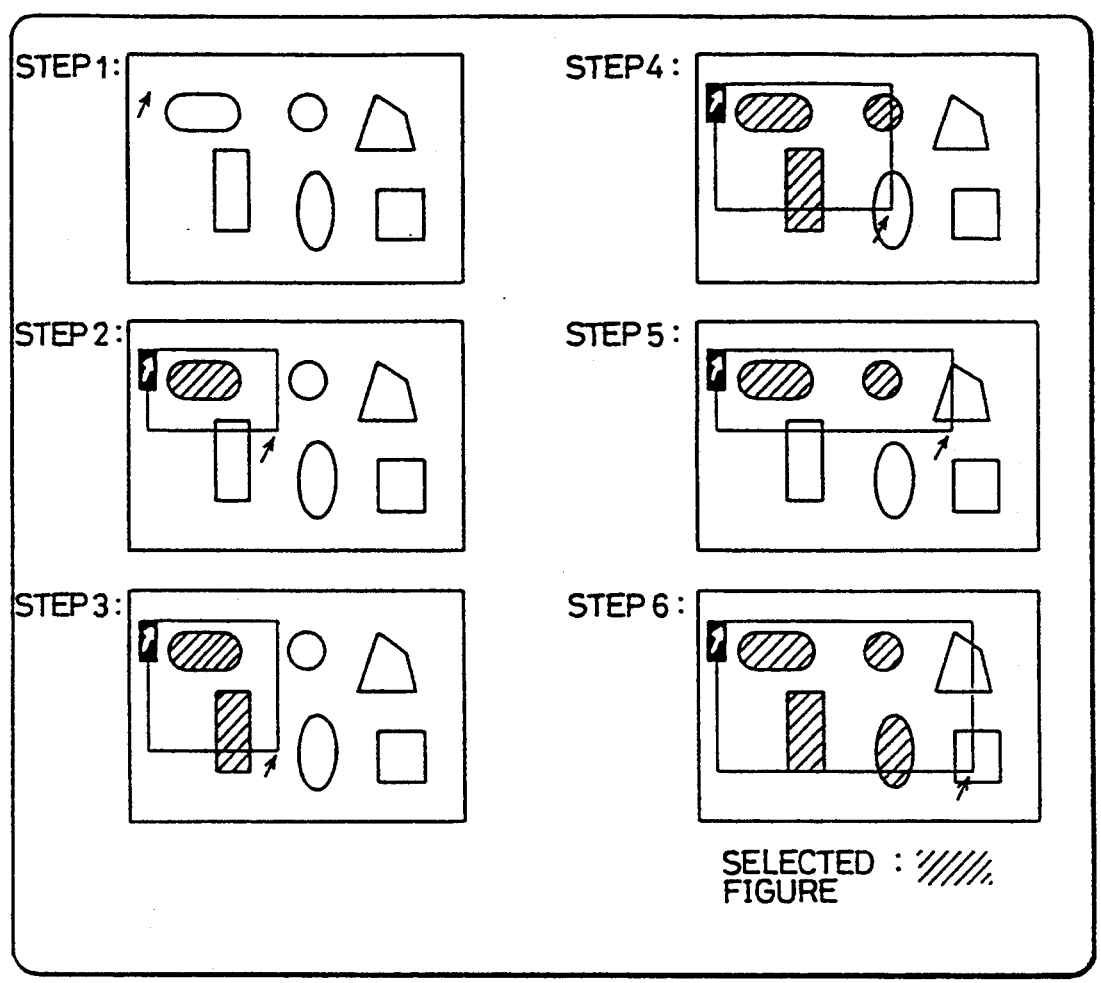
FIG. 8 is a schematic view showing one example of operation when a plurality of displayed figures are selected using selection rectangles.

Now, referring to FIG. 8, a description will be provided on the case in which a plurality of figures displayed on a display picture plane are selected be designating a region by a drag operation. In the selection of the figures, circle, oval, ellipse, square, rectangle, and polygon are utilized as attributes provided to figures. The association coefficients between these attributes are defined as follows.

TABLE 2

| Attribute of Reference Object | Attribute of Non-reference Object | | | | | |
|---|---|---|---|---|---|---|
| | Circle | Ellipse | Oval | Square | Rectangle | Polygon |
| Circle | 1.0 | 0.7 | 0.3 | 0.3 | 0.2 | 0.2 |
| Oval | 0.7 | 1.0 | 0.5 | 0.2 | 0.3 | 0.2 |
| Ellipse | 0.3 | 0.7 | 1.0 | 0.5 | 0.7 | 0.2 |
| Square | 0.3 | 0.3 | 0.3 | 1.0 | 0.7 | 0.3 |
| Rectangle | 0.3 | 0.3 | 0.2 | 0.8 | 1.0 | 0.5 |
| Polygon | 0.5 | 0.2 | 0.2 | 0.3 | 0.3 | 1.0 |
| NIL | 1.0 | 1.0 | 1.0 | 1.0 | 1.0 | 1.0 |

Operation of the association degree $C_i$ of the i-th selection object is for example given by the following equation:

$$C_i = a_i \times \{1 - S_i/S_o\} \quad (2)$$

where $C_i$ represents the association degree between a pointed position and the i-th selection object, $a_i$ an association coefficient decided between the attribute of a reference object and the attribute of the i-th non-reference object, $S_i$ distance between the object and a selection rectangle, and $S_o$ a distance constant. The "selection rectangle" indicates a rectangle with its upper left and lower right vertexes, at the starting point and the ending point of a region, respectively, as shown in step 2 of FIG. 6. The "distance constant" is similar to "size of character and character distance" in equation (1) and a value appropriately set at the time of selecting a figure. If the value is large, the number of figures to be selection objects is large, and if the value is small the number is small. The distance constant can be the maximum length of a reference object, for example, and in FIG. 8, it is the maximum value of the diameter of an oval.

When the mouse cursor is at the position shown in step 1 in FIG. 8, the switch provided to the mouse is pressed. In this case, since there is not any already selected object, the association coefficient between "NIL" attribute and the attribute of each figure in Table 2 is referred to. An association degree is calculated for every figure according to these association coefficients. In this embodiment, in determining whether or not to select a figure, a certain threshold value is provided, and if the association degree of a certain figure is beyond the threshold value, the figure will be selected. The figure selected first becomes a reference object in calculating an association degree performed in a continuing selecting operation thereafter. In this regard, the way deciding the reference object in this embodiment is different from those shown in FIGS. 6 and 7. In step 1 in FIG. 8, "ellipse" is selected first and becomes a reference object as well.

Now referring to step 2, a drag operation is performed. More specifically, the mouse pointer is moved while pressing the switch of the mouse. As the position of the pointer moves, the selection rectangle deforms. An association degree is calculated from the distance between the selection rectangle and each figure, and the attribute of the position of the pointer and the attribute of each figure. The same attribute as the reference object is provided to the pointer position. If the association degree of a certain figure is beyond a certain threshold value as described above, the figure is added to the already selected objects. When the operation is performed as the pointer position changes, the already selected object changes as shown in a figure in hatching in steps 1-6 in FIG. 8.

If an ellipse is a reference object as shown in Table 2, the association coefficient of ellipse is the highest followed by oval, circle, square, rectangle, and then polygon which has the smallest association coefficient. Since it is easier to select a figure as the figure has a larger association coefficient with a reference figure, the readiness of selection decreases in the order of ellipse, oval, circle, square, and rectangle. Conversely, according to this method, a figure less frequently selected can be less selectable by reducing its association coefficient with other figures.

The embodiments of the invention have been described illustrating the example, of selecting operations of characters and figures. However, the selection objects are not limited to them. Any object displayed on a display device such as of computer can be a selection object according to the invention. Although in the embodiment, the mouse and pen are used as the pointing device by way of illustration, the input instrument is not limited to the above-described kinds. Although only the two-dimensional display device has been described for the purpose of simplifying the description in the above-described embodiments, the present invention is generally applicable to a display device such as a three-dimensional display device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In an information processing apparatus including display means for displaying a plurality of objects on a prescribed display region of said display means, position designation means manually operable for designating an arbitrary point on said prescribed display region, means for outputting information for specifying the position of said designated arbitrary point, and storage means, a method of designating one or more of the plurality of objects displayed on said prescribed display region utilizing said position designation means, comprising the steps of:

designating an arbitrary point on said display region utilizing said position designation means and obtaining information for specifying the position of said designated arbitrary point, and selecting one of said objects depending upon a distance decided between said designated arbitrary point and each said object based on the information for specifying said position, an attribute provided to each of said objects, and an attribute provided to said designated arbitrary point.

2. A method as recited in claim 1, wherein said selecting step includes, providing one of a prescribed plurality of kinds of attributes to each of said objects, providing one of said plurality of kinds of attributes to said designated arbitrary point calculating an association degree between said designated arbitrary point and each said object depending upon the distance between said designated arbitrary point and each said object based on said information for specifying said position, the attribute of each said object, and the attribute of said designated arbitrary point, and comparing said calculated association degrees with one another and selecting an object which provides an association degree satisfying a prescribed condition among said plurality of objects.

3. A method as recited in claim 2, wherein
said step of selecting the object satisfying the prescribed condition includes selecting an object which provides the largest association degree among said plurality of objects.

4. A method as recited in claim 3, wherein
said step of calculating the association degrees includes prestoring in said storing means a table of association coefficients, predetermined between said plurality of kinds of attributes, calculating for each of said plurality of objects, a distance-dependent association degree depending exclusively on the distance on said display region between said designated arbitrary point and each said object based on the information for specifying the position of said designated arbitrary point, and calculating an association degree by multiplying the distance-dependent association degree calculated for each of said plurality of objects by an association coefficient corresponding to the attribute of the object and the attribute of said designated arbitrary point, by referring to said table of association coefficients.

5. A method as recited in claim 3, wherein
said step of calculating the association degree includes, prestoring in said storing means a table of association coefficients predetermined between said plurality of kinds of attributes, calculating for every object present in a prescribed region that includes said designated arbitrary point among said plurality of objects, a distance-dependent association degree depending exclusively upon the distance on said display region between said designated arbitrary point and each said object based on the information for specifying the position of said designated arbitrary point, and calculating an association degree by multiplying the distance-dependent association degree calculated for each object by an association coefficient corresponding to the attribute of the object and the attribute of said designated arbitrary point, by referring to said table of association coefficients.

6. A method as recited in claim 4, wherein
said step of providing an attribute to said designated arbitrary point includes providing said designation point with the attribute of an object satisfying a predetermined condition among already selected objects.

7. A method as recited in claim 6, further comprising selecting all the objects present between the object selected by said step of selecting one object and the already selected objects and adding these newly-selected objects to said already selected objects.

8. A method as recited in claim 6, wherein
said step of providing said designated arbitrary point with the attribute of the object satisfying said predetermined condition comprises providing said designated arbitrary point with the attribute of the object that was most recently selected by said step of selecting one object.

9. A method as recited in claim 7, wherein
said step of providing said designated arbitrary point with the attribute of the object satisfying said predetermined condition includes, determining whether or not an already selected object is present, and selectively providing said designated arbitrary point with the attribute of the object that was most recently selected by said step of selecting one object or a predefined specific attribute depending upon whether or not an already selected object is present.

10. A method as recited in claim 3, wherein
said step of selecting the object satisfying the prescribed condition includes selecting among said plurality of objects, an object present on the display of said display means and within a prescribed range including said designated arbitrary point and providing the largest association degree in association with said designated arbitrary point.

11. A method as recited in claim 1, wherein
said display means has a predetermined plurality of display regions, and displays each of said objects inside any of said display regions, and said step of selecting one object includes correcting said information for specifying the position of said designated arbitrary point and the attribute of said plurality of objects, so that the information indicates a value representing the inside of a region satisfying a prescribed condition, among the display regions on which said plurality of objects are displayed, and selecting an object displayed in a display region in which said designated arbitrary point is present.

12. A method as recited in claim 11, wherein said step of correcting said information includes, providing each said object with one of a prescribed plurality of kinds of attributes, providing said designated arbitrary point with one of said plurality of kinds of attributes, calculating an association degree between each said object and said designated arbitrary point depending upon a distance defined between said designated arbitrary point and each said object based on said information for specifying the position of said designated arbitrary point, the attribute of each said object, and the attribute of said designated arbitrary point, comparing said associated degrees between one another and selecting a display region on which an object is displayed which object provides an association degree satisfying a prescribed condition among said plurality of objects, and correcting the information for specifying said position of said designated arbitrary point so as to indicate a position within said selected within said selected display region.

13. A method as recited in claim 11, wherein said step of correcting said information includes, providing each said object with one of a prescribed plurality of kinds of attributes, providing said designated arbitrary point with one of said plurality of kinds of attributes, calculating an association degree between each said object and said designated arbitrary point depending upon a distance between said designated arbitrary point and each said object present within a prescribed range including said designated arbitrary point on said display region, the attribute of each said object, and the attribute of said designated arbitrary point, comparing said associated degrees between one another and selecting a display region on which an object is displayed which object provides an association degree satisfying a prescribed condition among said objects present in the prescribed range including said designated arbitrary point on said display region, and correcting said information for specifying the position of said designated arbitrary point so as to indicate a position within said selected display region.

* * * * *